Dec. 13, 1966 I. A. D'ALESSANDRO ETAL 3,292,169

MAGNETIC HEAD SUSPENSIONS

Filed Dec. 12, 1962

INVENTORS.
IGNATIUS A. D'ALESSANDRO
CLARENCE A. MULLER
BY
S. C. Yeaton
ATTORNEY 3,292,169

MAGNETIC HEAD SUSPENSIONS

Ignatius A. D'Alessandro, Bethpage, and Clarence A. Muller, Northport, N.Y., assignors to Sperry Rand Corporation, Great Neck, N.Y., a corporation of Delaware Filed Dec. 12, 1962, Ser. No. 244,142
9 Claims. (Cl. 340—174.1)

Figure 1:
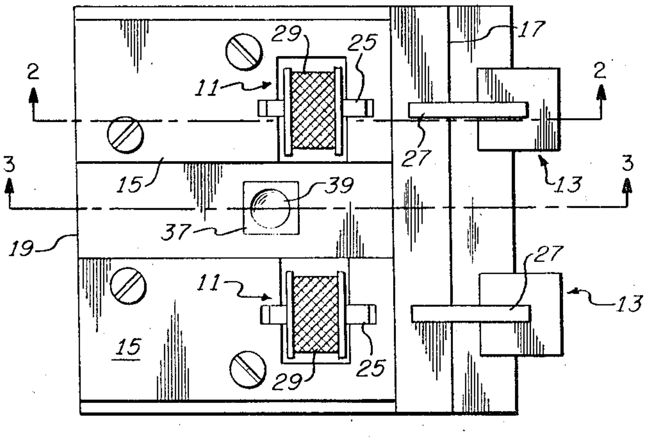

This invention relates to magnetic drum memory systems, and more particularly to suspension means for magnetic heads used in such system.

Electronic computers using magnetic drum memory systems typically employ a transducer in the form of a magnetic head to record and read digital data. The magnetic head is positioned above the drum so that the surface of the drum is magnetically coupled to the head through a small air gap.

Numerous methods have been devised for supporting the magnetic head in such a way that the length of the air gap is maintained constant within precise limits. One of these methods uses the film of moving air created by the rotating magnetic drum as a cushion on which the magnetic head can be floated. Although such a system provides a precisely controlled air gap, auxiliary means must be devised for orienting the magnetic heads so that they maintain precise alignment with the desired magnetizable path in the rotating drum.

Furthermore, in these systems, the magnetic head must be supported by auxiliary support means when the drum rotation is stopped. Elaborate means have been devised for this purpose, in which the magnetic head is supported in a retracted position until a speed sensing means detects that the drum has reached a suitable speed. Such auxiliary means are cumbersome as well as expensive. Since many heads muct be packed into a small space around the drum, the large physical size is objectionable.

An alternate suspension means has been devised in which the head is connected permanently to a spring mounting means. When the drum is not rotating, the spring means urges the magnetic head into contact with the magnetizable surface of the drum. As the drum is accelerated, the moving air film lifts the magnetic head against the force of the spring until a force balance is achieved. Such systems cause undue wear on the drum surface, exert additional frictional drag on the drum, and require considerable force to lift the magnetic head against the spring force during acceleration. Furthermore, the spring must be made compliant enough so that the outward force exerted by the moving air stream can raise the magnetic head from the drum surface. With such a compliant spring, however, mechanical resonance of the spring and magnetic head combination often occurs at such a frequency that relatively large oscillations can be excited by external shock or vibration.

It is an object of the present invention to provide a magnetic head suspension system that is relatively simple and inexpensive.

It is another object of the present invention to provide a magnetic head suspension system that is relatively insensitive to external vibration.

It is another object of the present invention to provide a magnetic head suspension system that is easily adjusted.

It is still another object of the present invention to provide a magnetic head suspension system that is self-aligning.

It is yet another object of the present invention to provide a magnetic head suspension system that permits a large number of heads to be mounted in a small space.

These and other objects are achieved according to the principles of the present invention by providing a disengageable single pivot suspension that permits the air film created by the rotating drum automatically to orient the magnetic head for optimum performance.

Figure 2:
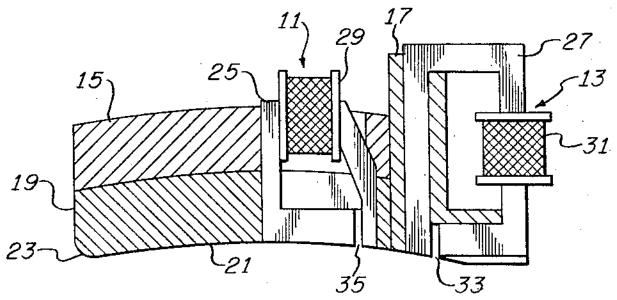
Figure 3:
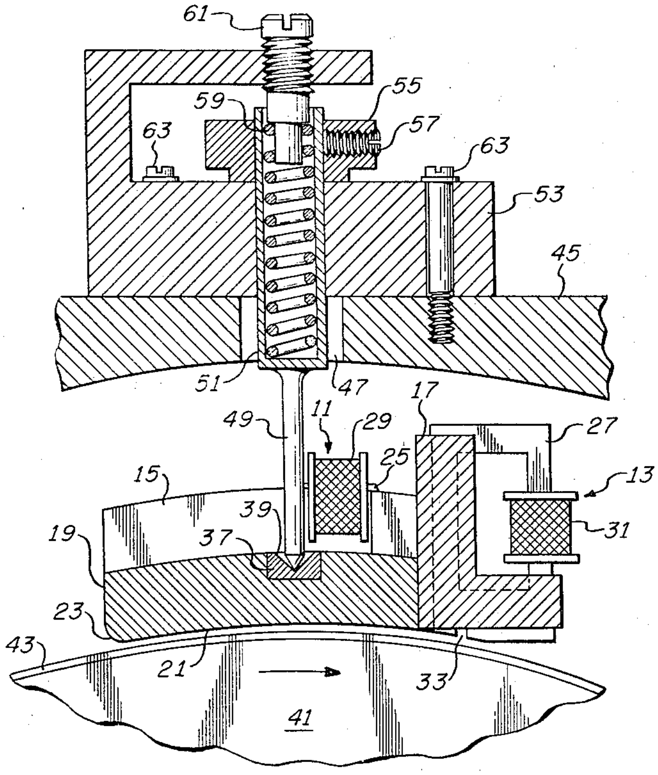

The novel features which are believed to be characteristic of the invention, together with further objects will be better understood by referring to the following description and the accompanying drawings in which:

FIG. 1 is a plan view of a magnetic head assembly adapted to be used in the present invention, FIG. 2 is a cross sectional elevational view taken along the line 2—2 of FIG. 1, and FIG. 3 is a cross sectional view of a suspension system constructed according to the principles of the present invention.

Referring now to FIGS. 1 and 2, a typical magnetic head assembly for use in practicing the invention includes a pair of recording or "write" heads 11 and a corresponding pair of "read" heads 13. The individual heads are positioned in suitable support members 15 and 17 and secured in place by means of a commercial resinoid potting compound. The entire assembly is mounted on an arcuate slider bearing 19. The slider bearing has an inner concave surface 21 with a slight radius 23 on its leading edge. The magnetic heads include core members 25 and 27 and the magnet coils 29 and 31. The air gaps 33 and 35 are arranged so that their edges lie in the concave surface 21. A particular arrangement of magnetic heads that is presently preferred for this purpose is disclosed and claimed in the copending application of Fred H. Bargetzi, Serial No. 170,027, filed January 31, 1962, now Patent No. 3,150,357 dated September 22, 1964, entitled "Magnetic Transducer," and assigned to the same assignee as the present application.

An anvil 37 is inserted in the upper convex surface of the slider bearing. The anvil is preferably in the form of a jewelled bearing and contains a conical cavity 39.

FIG. 3 is a cross sectional view of a magnetic head assembly suspended in an operating position according to the principles of the invention. A cross section of the magnetic head assembly has been taken along the line 3—3 of FIG. 1 so as to better illustrate the suspension.

The anvil 37 is located so that the vertex of the conical cavity is over the region of maximum air film pressure.

The magnetic head assembly is positioned over a magnetic drum 41 that typically contains a thin coating of magnetizable material 43. The drum is supported inside a conventional housing 45. An oversize opening 47 in the housing provides communication between the exterior and the operating elements of the system. A pivot pin 49 includes a hollow sleeve 51. The sleeve passes through a bore in a support block 53. The bore is carefully machined to provide an accurate sliding fit so that the sleeve is able to slide freely without side play. A stop collar 55 is secured to the sleeve by means of a set screw 57 at such a position that the conical tip of the pivot pin 49 engages the bottom of the conical cavity 39 when the magnetic head assembly reaches the lowest position it will occupy in the operative or floating state. The conical tip of the pivot pin has a smaller vertex angle than the corresponding angle of the conical cavity 39 so that the magnetic head assembly may pivot or rotate about the tip of the pivot pin. The coil spring 59 inside the sleeve 51 is placed under initial compression by an adjustable set screw 61.

The inner or concave surface 21 of the slider bearing is matched to the cylindrical surface of the drum so as to channel the moving air film between these surfaces and thus provide an aerodynamic lifting force sufficient to raise the magnetic head assembly into a floating position. A suitable match can be obtained by making the radius of curvature of the surface 21 equal to, or slightly larger than, the radius of the drum. A typical embodiment of the invention uses a drum having a radius of 1.800 inches. The surface 21 has a radius of curvature 0.002 inch greater than the radius of the drum.

The magnetic head assembly can assume any of three states: an operative or floating state; a transitional state; or a quiescent state.

The operative state occurs when the drum is rotating at normal speed and the magnetic head assembly is lifted from the drum surface by an amount sufficient to provide a desired air gap. The drum rotates in a clockwise direction so that the film of moving air created by the drum is funneled between the surface of the drum and the concave surface 21 of the slider bearing. This lifts the magnetic head assembly so that the bottom of the cavity 39 contacts the tip of the pivot pin. Thus in the operative state, the magnetic head assembly is pivotally engaged with the pivot pin so that the assembly can roll, pitch, or yaw about the point of the pivot pin.

The set screw 61 serves to adjust the initial compression of the spring 59 so that the spring exerts an inward force that just balances the outward force exerted by the air stream when the magnetic head assembly is floating at the proper distance above the drum surface.

The moving air stream has a substantially constant thickness. Irregularities or run-out in the drum surface cause a change in the deflection of the spring 59 so that the length of the air gap remains substantially constant even though the magnetic head assembly assumes varying positions with respect to the housing 45.

The suspension of the present invention, furthermore, cooperates with the moving air stream to provide a self-alignment of the magnetic head assembly. The moving air stream can be visualized as a thin elastic film. If the assembly tends to roll or pitch about the pivot point, one edge of the concave surface approaches the surface of the rotating drum. This edge will experience an increased outward force tending to restore the assembly to its proper orientation or attitude.

A similar correction takes place if the magnetic head assembly attempts to yaw or rotate about the axis of the pivot pin. Rotation of the assembly causes one corner of the trailing edge to have a forward component of motion. Because of the concave shape of the surface 21, this rotation brings the corner closer to the surface of the drum and thereby increases the pressure exerted by the air stream. The increased pressure adjacent to this corner tends to restore the assembly to its proper attitude.

Since the air gaps required for devices of this type are in the order of a few ten-thousandths of an inch, the adjustment of the air gap is a critical and painstaking operation. The present invention provides a relatively simple means for adjusting the air gap.

The length of this air gap is determined by the position of the conical end of the pivot pin 49. The spacing of the pivot pin from the drum is adjusted by first clamping the stop collar 55 to the sleeve by means of the set screw 57. After the initial coarse adjustment is made, the support block 53 can be moved along the outer surface of the housing 45 in order to obtain a fine adjustment. As the support block is moved and the axis of the pivot pin is displaced from the axis of the drum, the magnetic head assembly automatically pivots in the vertical plane around the point of the pivot pin so as to maintain the proper attitude. The air gap, however, is lengthened since the point of the pivot pin recedes gradually from the surface of the drum. Thus, for a typical system, twenty-five thousandths of an inch motion of the support block increases the length of the air gap by approximately two ten-thousandths of an inch. After the air gap has been adjusted, the support block can be permanently secured to the housing by suitable means such as the screws 63 passing through oversize holes in the support block.

During the time that the rotating drum is accelerating or decelerating, the magnetic head assembly is in the transitional state. As the drum is accelerated, the magnetic head assembly rises automatically into an operating position as the drum speed approaches the desired value. While in the transitional state, the assembly is not pivotally engaged with the pivot pin. The pivot pin contacts the sides of the conical cavity, however, so that the assembly is still laterally restrained by the action of the pivot pin alone. Since the assembly is positioned automatically, the invention overcomes the need for complicated speed sensing means to release the magnetic head assembly when the drum reaches the operating speed.

The magnetic head assembly rests in the quiescent state when the rotation of the drum has been stopped so that there is no film of moving air to provide a lifting force. The assembly rests against the drum surface and is restrained from lateral motion by the pivot pin. Since the stop collar 55 prevents the pivot pin from going beyond the lowest position it occupies in the operating state, the spring force is removed from the magnetic head assembly during inoperative periods. The assembly is freely movable between its position at rest against the drum surface and its lowest floating position. The conical cavity 39 is deeper than the length of the air gap, however, so that in the operative position, the tip of the pivot pin engages the walls of the cavity so as to restrict the lateral movement of the assembly. When the drum is accelerated, the moving film need overcome only the effect of gravity on the assembly since the balancing spring force is not exerted until the assembly reaches the lowermost floating position. This reduces the frictional drag and minimizes the wear on the drum surface.

Since the moving air film need not lift the magnetic head assembly against the spring force during periods of acceleration, the spring can be made relatively stiff. The combination of a relatively stiff spring and light weight magnetic head assembly raises the frequency of mechanical resonance so that the system is comparatively insensitive to external shock and vibration.

Although a magnetic head assembly has been described in which two pairs of write and read heads are combined on a unitary assembly, it will be appreciated that the principles of the invention can be applied to an assembly containing any reasonable number of magnetic heads.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. A single point suspension for a magnetic head assembly of the type adapted to float in an operative state on the film of air created by an associated rotating drum comprising a single pivot pin radially disposed with respect to said drum for pivotally positioning the magnetic head assembly during normal operation, a pivot point on the inner end of said pivot pin for contacting and pivotally positioning the magnetic head assembly, spring means to exert an inward force through the pivot pin on the magnetic head assembly during normal operation, and stop means to prevent the spring means from exerting an inward force on the magnetic head assembly when this assembly drops below the position it occupies in the operative state.

2. A single point suspension for a magnetic head assembly of the type adapted to assume an operative floating position on the film of air created by an associated rotating drum comprising a single pivot pin radially disposed with respect to said drum for pivotally positioning the magnetic head assembly during normal operation, a pivot point on the inner end of said pivot pin for contacting and pivotally positioning the magnetic head assembly, spring means attached to the pivot pin for exerting an inward force on the magnetic head assembly during normal operation, and stop means to prevent the spring means from exerting an inward force on the magnetic head assembly when this assembly drops below the operative floating position, said magnetic head assembly being restrained from lateral movement only by said pivot pin.

3. A self-aligning magnetic head assembly for use with a magnetic drum memory system comprising a slider bearing on said magnetic head assembly constructed to float on the moving air film created by the rotating magnetic drum during normal operation, said magnetic head assembly further being free to drop to the drum surface during quiescent periods, an anvil in the upper surface of said slider bearing, said anvil containing a conical cavity, a single pivot pin arranged to engage pivotally with said conical cavity when the magnetic head assembly is in a floating position, said magnetic head assembly being restrained from lateral motion only by said single pivot pin, and means to prevent the pivot pin from going below the position it occupies when the magnetic head assembly is in the lowest floating position during normal operation.

4. A single point suspension system comprising:

(a) a rotatable magnetic drum,
(b) a magnetic head assembly adapted to float on the air film created by the rotation of the drum during normal operation,
(c) an anvil in the magnetic head assembly,
(d) said anvil containing a single conical cavity,
(e) a single pivot pin resiliently mounted above said conical cavity,
(f) a conical tip on said pivot pin having a vertex angle smaller than the vertex angle of the conical cavity,
(g) said pivot pin being disposed so that the conical tip pivotally engages the conical cavity during normal operation,
(h) spring means connected to said pivot pin to resist outward motion of the magnetic head during normal operation,
(i) and stop means to limit the inward travel of the pivot pin at a level such that the conical cavity automatically drops out of pivotal engagement with the conical tip when the drum rotation is stopped,
(j) said magnetic head assembly being restrained from lateral motion only by said pivot pin.

5. In a magnetic drum storage system:

(a) a rotatable drum,
(b) an arcuate slider bearing disposed with its concave surface adjacent to the rotatable drum,
(c) a radius on the leading edge of the slider bearing to direct the film of air created by the rotation of the drum between the slider bearing and the drum surface thereby lifting the slider bearing outward into a position in the operative state,
(d) said slider bearing containing one and only one conical cavity in its convex surface,
(e) a single pivot pin mounted above the slider bearing and arranged to enter the conical cavity,
(f) said slider bearing being restrained from moving parallel to the drum surface only by the single pivot pin,
(g) spring means to resist outward motion of the pivot pin, and
(h) stop means to prevent the pivot pin from moving inward beyond the position it occupies when the slider bearing is in the lowest position of the operative state.

6. A single point suspension for a magnetic head assembly in a rotating drum memory system comprising:

(a) an arcuate slider bearing disposed with its concave surface adjacent to the cylindrical surface of the drum,
(b) said arcuate slider bearing containing a conical cavity in its convex surface,
(c) a single pivot pin disposed above said slider bearing and arranged to enter said conical cavity,
(d) said slider bearing being freely movable between a position in the quiescent state in which the bearing contacts only the drum surface and the pivot pin and an operative state in which the bearing is in contact only with the pivot pin, and
(e) stop means to prevent the pivot pin from going below the point at which it contacts the bottom of the conical cavity when the slider bearing is in the lowermost position of the operative state.

7. In a magnetic drum storage system:

(a) a rotatable drum,
(b) a slider bearing,
(c) an inner concave surface on said slider bearing,
(d) said slider bearing being so disposed that the concave surface is adjacent to the cylindrical surface of said drum,
(e) said slider bearing being freely movable between a position in which the concave surface contacts the drum and a floating position in which the concave surface is separated from the drum by a desired air gap,
(f) an anvil on the outer surface of said slider bearing,
(g) a conical cavity in said anvil having a depth greater than the desired air gap,
(h) a pivot pin constructed and arranged to project into said conical cavity,
(i) stop means to prevent the pivot pin from going below the position in which it contacts the bottom of the conical cavity when the bearing is in the lowermost floating position, and
(j) spring means to resist upward motion of the pivot pin.

8. In a magnetic drum storage system:

(a) a rotatable drum,
(b) an arcuate slider bearing disposed over the curved surface of the drum, said slider bearing being freely movable between a position in contact with the drum surface and a lowermost floating position,
(c) said arcuate slider bearing containing a conical cavity in its convex surface,
(d) said conical cavity having a depth greater than the distance between the in-contact position and the lowermost floating position of the slider bearing,
(e) a pivot pin constructed and arranged to project into the conical cavity,
(f) stop means to prevent the pivot pin from going below the point at which it contacts the bottom of the conical cavity when the bearing is in the lowermost floating position, and
(g) spring means to resist upward motion of the pivot pin.

9. A magnetic memory system of the type in which information is stored along circumferential magnetizable paths on the surface of a rotatable drum comprising:

(a) a housing enclosing a substantial portion of the drum,
(b) said housing including an opening in communication with the cylindrical surface of the drum,
(c) a flat exterior surface surrounding the opening in said housing, said flat surface being parallel to a tangent drawn to the drum surface underneath said opening,
(d) a support block positioned on the flat surface over said opening,
(e) said support block containing a bore disposed perpendicularly to said flat exterior surface,
(f) a pivot pin slidably mounted in said bore so as to project inwardly through said opening,
(g) spring means mounted on said support block to urge said pivot pin inwardly,
(h) said opening being sufficiently large to permit adjustment of the location of the pivot pin along a line that is parallel to the flat exterior surface and in the plane containing the entire circumferential magnetizable path.

(i) a conical point on said pivot pin,
(j) an arcuate slider bearing disposed with its concave surface adjacent to the cylindrical surface of the rotatable drum,
(k) said slider bearing containing a conical cavity in its convex surface, said cavity having a vertex angle greater than the vertex angle of the conical point of the pivot pin,
(l) said slider bearing being further disposed so that the conical point of the pivot pin can enter the conical cavity,
(m) a rounded leading edge on the slider bearing for funneling air between the slider bearing and the drum surface so as to lift the bearing into an operating position when the drum is rotated, and (n) stop means to prevent the pivot pin from going below the point at which it contacts the bottom of the cavity when the bearing is in the lowermost operating position.

References Cited by the Examiner

UNITED STATES PATENTS

| | | | |
|---|---|---|---|
| 2,862,781 | 12/1958 | Baumeister | 179—100.2 |
| 2,961,494 | 11/1960 | Darou | 340—174.1 |
| 3,193,835 | 7/1965 | Wadey | 340—174.1 |

TERRELL W. FEARS, *Acting Primary Examiner.*

BERNARD KONICK, *Examiner.*

V. P. CANNEY, *Assistant Examiner.*